Oct. 31, 1939.     H. R. ANSEL     2,178,415
SHEET METAL JOINT
Filed July 31, 1937
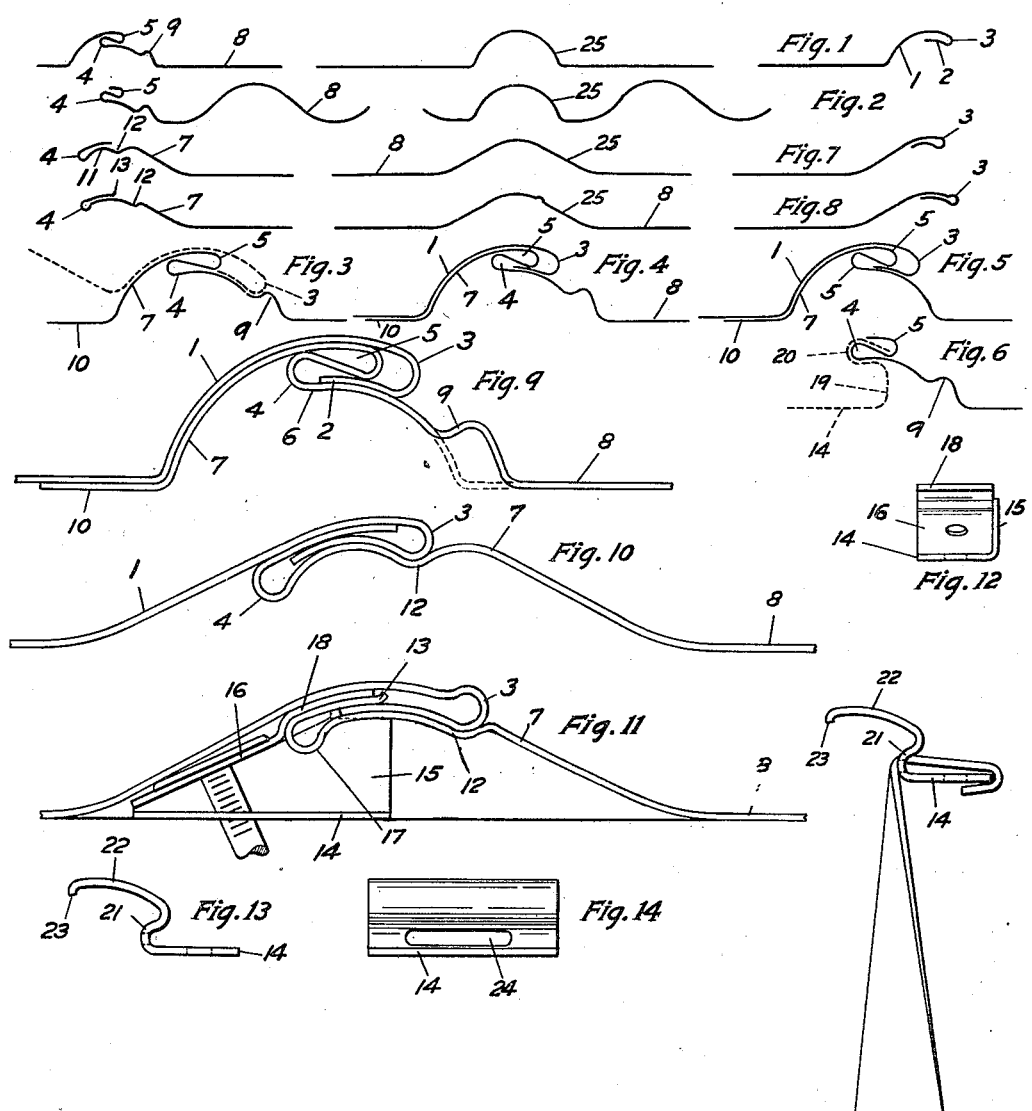
INVENTOR.
Harry R. Ansel
BY
W. S. Babcock
ATTORNEY.

Patented Oct. 31, 1939

2,178,415

UNITED STATES PATENT OFFICE 2,178,415

SHEET METAL JOINT

Harry R. Ansel, Cleveland, Ohio, assignor to The Kor-Lok Company, Cleveland, Ohio, a corporation of Ohio Application July 31, 1937, Serial No. 156,774

14 Claims. (Cl. 189—86)

The invention to be hereinafter described relates to sheet metal joints.

Great quantities of metal sheets are used extensively both in farm buildings and for industrial uses. Those used for agricultural purposes are usually of appreciably lighter weight or gauge. While for industrial uses corrugation is common, and the heavier sheet is better adapted, what is known as the standard 5V crimp, or the three rib or five rib standard types are used more generally in agricultural sections. Those lighter weight sheets are much more widely accepted and used through agricultural communities.

In all of the above types there has been great objection because the assembled sheets are not weather proof. They leak in rain and do not prevent draughts. In addition, they are insecurely held, because rust about the nail holes of the nails by which they are fastened, soon frees the nails and leaves the sheets unfastened. It is impossible to satisfactorily salvage them for reuse. Their method of application—nailing—is slow.

The main objects of this invention are to avoid the above and other drawbacks and produce a joint which may be made in quantity at low cost, one which, assembled, will be weather tight both as to leakage and as to draughts; a joint which may be assembled in place with the least effort, least time consumption and least manipulation, a joint which, assembled, will remain so indefinitely, and one in which the joint may be easily and quickly disassembled and the sheets salvaged wholly intact and in thorough condition for immediate reassembly and reuse.

In order to more clearly disclose the construction, operation and use of the invention, reference should be had to the accompanying drawing forming part of this application. Throughout the several views of the drawing, like reference characters designate the same parts in the several views.

In the drawing:

Fig. 1 is a diagrammatic view partly broken away, of a light weight sheet embodying the preferred form of the invention;

Fig. 2 is a like view of a heavier weight sheet, with corrugations, the male joint member being omitted;

Fig. 3 is a diagrammatic edge view of the cooperating joint members of two sheets, showing the first step in the assembly;

Fig. 4 is a similar view, assembly completed;

Fig. 5 is a view similar to Fig. 4, showing a modification;

Fig. 6 is a similar view showing a further modification;

Figs. 7 and 8 are diagrammatic edge views, partly broken out, of sheets showing further modifications of joint members;

Fig. 9 is an enlarged edge view of an assembled joint from sheets of Fig. 1;

Fig. 10 is a similar view of an assembled joint from sheets of Fig. 7;

Fig. 11 is a similar view of an assembled joint from sheets of Fig. 8;

Fig. 12 is a right hand end view of the clip shown in Fig. 11;

Fig. 13 is an edge view of a modified form of clip;

Fig. 14 is a right hand view of Fig. 13; and

Fig. 15 is an edge view of the clip of Figs. 13 and 14, with strap attached.

It will be noticed that two opposite edges of a sheet are provided with main flanges offset from the plane of the sheet and curved concentrically, when in assembled relation, or circularly on the same radius in lateral cross section to provide rounded ribs 1 and 7, and that a portion of each rib is bent back on a gradual-curvature loop-like bend forming the rounded edge of the rib and providing a connecting or coupling flange portion having a curvature approximating that of the respective rib. The coupling flange portion of the male joint member, in all forms of the invention, is a simple strip or sheet extending in a single simple curve from its rib to its free edge. The same is true of several forms of the female joint member. Several other forms of the female joint member continue that coupling flange but in a reverse direction, forming two spaced branches and two connecting loops all of which are explained in detail hereafter. In every instance it will be noted that the first portion of the female coupling flange lies on the opposite side or face of the sheet relatively to that on which the male coupling flange lies and that that portion lying between the first and second bends of that flange has a curvature approximately the same as that of the corresponding male coupling flange at the opposite edge of the same sheet. In one form of the invention the female coupling flange is continued from such second bend on the same curvature and in the same direction as its rib 7 to complete the rib and then further continued to form a nailing strip. Ribs 1 and 7, it will be noted, are of approximately the same diameter and curvature.

Figures 1 to 6, inclusive, of the drawing, show a preferred form of the invention. This form, as will later appear, in process of production, may be made with or without an integrally formed nailing strip, as may be desired. For agricultural use, it will be made from sheets of light weight such as 26, 28, 29, etc., gauge. Preferably, it will be made as a three rib sheet, one rib along each of two opposite sides and each including the bends or joint flanges, and the third rib centrally of the sheet and parallel with the other ribs. The main flange, along one edge of the sheet is offset considerably above the plane of the sheet on a moderate regular curve, relatively to the plane of the sheet to form rib 1, the free edge or flange 2 being bent back upon itself on substantially a concentric curvature but spaced considerably from the sheet by a wide gradual loop, bend or curve 3. This constitutes the male member of the joint (see Fig. 1.) The main flange along the opposite edge of the sheet (Figs. 1, 3, 4, and 5) in which the female member is formed, has a rib 7 of the same curvature as rib 1. In the construction illustrated by these figures, the coupling flange of rib 7 is formed into the female joint member comprising a double curvature fold or loop, the first and upper branch 5 extending in the same direction as the bend 3, having dimensions permitting it to pass freely into 3 but being merged in and continuous with the second loop 4. Loop 5 opens in the same direction as bend 3. Loop 4 opens in the opposite direction and its lower branch 6 is on the same curvature as male coupling flange 2 and is spaced from the outer curve a distance equal to the width of the folds or loops 4—5. In the form shown in Figs. 1, 2, 3, 4, and 6, branch 6 is extended, on the same curvature from loops 4—5 toward the sheet 8 a distance very slightly more than the length of the male coupling flange 2, providing a stop shoulder 9, a short distance above the plane of the sheet, for a purpose to be later disclosed. It will be noticed that the closed ends of all bends or loops are appreciably beyond the apex of the rib, either to one side or the other and whether in assembled or disconnected relation. As clearly shown in Fig. 1, the two loops 4 and 5 of the female member, are of considerable maximum diameter, tapering, oppositely, to zero. And, also, each of them, at its maximum is approximately equal in diameter to the maximum inside diameter of the bend or loop 3 of the male member. In this preferred form, the coupling flange of rib 7, after being formed into the female member with loops 4 and 5 is continued to complete rib 7 and terminates in a narrow nailing strip 10 through which nails are driven into the wood deck or other wooden frame beneath. In assembling this form, one sheet 8 will be laid and nailed. The next sheet will be tipped to the dotted line position of Fig. 3, with bend 3 against stop 9 and the ribs nested. That will place the free edge of the male member at the entrance to loop 4. The opposed approaching curves of the lower branch of 5 and of 6 provide an open V or funnel mouth freely, easily and surely guiding the male member to operative position. From the dotted line position, the second sheet is simply rotated downwardly about the centre of the nested ribs. As the rib 1 follows over the surface of rib 7, it will carry member 2 from the initial disengaged position of Fig. 3 to the final, operative, engaged and full nested position of Fig. 4. In that position it is noticeable that there is a considerable distance or space beteen the closed ends of 3 and the loop 5 which extends thereinto and that it forms a chamber lying beyond the rib apex and, in the same direction, beyond 5. It will also be noticed that the second plate or sheet, in its fully assembled position, completely overlies and covers the nailing strip.

In the above construction, the first point possible for the entrance of moisture is far above the plane of the sheet and only a short distance below the apex of the rib. That point is between the outermost part of the male coupling flange 2 and the surface of 6, where those two approach. Any water entering there, as in a rain storm, could continue, by capillary feed, into the enlarged bulbous loop or fold 4 beyond the rib apex. This, of course, destroys capillary attraction so that the water stops moving toward a possible leakage point. It simply accumulates in this loop 4, actually constituting an internal gutter. Capillary feed will remain discontinued until the water level in gutter 4 rises to the next capillary passage which is the contact between loop or gutter 5 and the inner surface of the male coupling flange 2. Having restarted, if the water should rise that far, the capillary feed would carry it into the chamber or passage within the loop between 3 and 5. There, again, capillary feed is destroyed and the water simply drains off as in a gutter. Actually, the closed bend 3 does constitute a second interior gutter. It will be understood of course, that both gutters 3 and 4 are continuous throughout the length of the sheet and are, at all times, open and unobstructed for free flow of any drainage or floor waters that may possibly seep in. Before capillary feed may again start toward a possible leakage point, gutter 3 must be flooded clear to the top of the gutter where the top inner surface leading from 3 approaches the top outer surface leading from 5. This is the next capillary passage. If it should ever reach that point, it is conceivable that it might work on by capillary attraction between the nested ribs 1 and 7, beyond the nailing strip and become a leak. This will be clearer on reference to Fig. 9. In Fig. 5, the curve of 6 has been continued to the sheet 8, omitting the stop shoulder 9 which, though very convenient in quickly positioning the parts for assembly as in Fig. 3, yet, is not material. By this modification, two bendng operations are eliminated. Otherwise, the construction of Fig. 5 is the same as that of Figs. 1, 3 and 4. In Fig. 6 the rib 7 is discontinued at the apex. Or, that half of the rib, beyond the open end of loop 5, including the nailing strip, is omitted. That, of course, still retains all of the gutter and drainage elements. Instead of the integral nailing strip 10, a nailing clip is used, as will later appear. In Fig. 2, also, the nailing strip is omitted. Figs. 2 and 6 are the same as to joint construction. Fig. 2 simply shows the modification of Fig. 6 applied to a heavier and corrugated sheet. In Figs. 1 and 6, inclusive, and 9, the joint construction is exactly the same. In all of them the initial entrance of the capillary passage has been elevated far above the plane of the sheet, to a point only slightly below the actual apex of the assembled joint. In all variations of this preferred form, large gutters are provided lying on opposite sides of the joint apex, near the joint apex and extending uninterruptedly the full length of the sheet. In all of them, the two gutters are separated by contacting surfaces acting as a dam and leaving only a capillary passage the entrance to which is appreciably above the bottom of the first gutter. In all of them the second and final gutter must be completely filled and flooded before water can possibly enter the last capillary passage. In all of them there are two complete and thorough destructions of portions of the capillary chain.

In all of them, including all variations of this preferred type, there is easy, quick, full length assembly by a simple rotating movement of the top sheet about the female rib of the under sheet, with automatic sure guidance of the male coupling flange directly into operative position within the female joint member, throughout the full length of the sheet. In all modifications of this preferred form there are two large-volume gutters, approximately at the joint apex, both in the same plane substantially parallel with that of the sheet and each about equi-distant on opposite sides of the apex.

Because of the two oppositely directed and oppositely shaped gutter bends 4 and 5 in the above preferred form, when the second sheet is applied in assembling the joint, there is a resilient spring action which appreciably increases the tightness or closeness of the joint assembly between the members 2, 3, 4, 5 and 6, as will be well understood.

As will be clearly understood from the above, the curvature of the male member along one edge of the sheet is substantially the same as that of the female member along the opposite edge. Therefore, obviously, the curvature of the joint member along one edge of any given sheet will be substantially the same as, nestable relatively to and will cooperate with the complementary joint member of approximately like curvature extending along the relatively opposite edge of any other sheet.

In Figs. 7, 8, 10 and 11 two forms are shown in which clips are used. They are three-rib types. In the form of Figs. 7 and 10, the male coupling flange 2 of the joint approaches more closely to the underside of its rib 1, after its loop is made. The gutter or drainage portion is approximately the same but flange 2 is appreciably longer and continually approaches the sheet from the point of the bend. When assembled, the gutter in the male joint member lies higher, relatively to the joint apex. In this form, the loop 4 terminates rib 7 and lies approximately entirely at the opposite side of the apex of the assembled joint, relatively to the male joint member and there is only one loop or fold 4 instead of two (4 and 5). In this form, there is a very narrow throat or opening of the male member and its free edge lies close to the sheet, instead of the considerable spacing and wide throat of the preferred form. To offset the narrow throat and close spacing, however, the coupling flange of the female member is considerably spaced from rib 7 by curving the rib as at 11. This curve terminates in a sharp depression just beyond the apex, providing a stop shoulder 12 the depth of which is just equal to the greatest outside depth or diameter of the male gutter so that, when assembled, the line across the joint is uninterrupted and continuous with the contour of rib 7. In this construction, the entire female gutter and most of the female coupling flange lie on that side of the apex opposite to the shoulder 12, so that only the gutter portion of the male member lies on the same side of the apex as shoulder 12. In assembling, it is only necessary, after the clips have been placed, as will later be set forth, to engage the edge of the male coupling flange beneath that of the female coupling flange and pull laterally into assembled relation. When assembled, there will, in this form, also, be two large-volume drainage gutters well up toward the joint apex, one being on either side. Here, again, the first entrance to the capillary passage is far removed from the plane of the sheet, far out of reach of all but flood waters and very close to the joint apex. Here, also, there are two successive, separated and complete breaches or breaks in the capillary chain, with free flowing drainage in both. In the preferred form—Figs. 1-6 and 9—the assembled gutters are both in a plane substantially parallel with that of the sheet, approximately at the joint apex, and about equi-distant on either side of the apex. In the form of Figs. 7 and 10, the assembled gutters are in a plane at a considerable angle to that of the sheet, the male gutter being at the higher position and nearer to the apex, with the female gutter considerably lower and appreciably farther from the apex.

The form of Figs. 8 and 11 requires a clip for securing. In it the construction is along the lines of the form of Figs. 7 and 10. In this modification, the male coupling flange of the joint extends appreciably farther to its respective side of the joint apex, when assembled, and the female coupling flange correspondingly approaches the apex from the opposite side. The stop shoulder 12 is correspondingly removed from the apex in the direction of the male member. Being so removed, and, therefore, proportionately lower, relatively to the apex, the curve leading to it can not be so depressed as in the form of Figs. 7 and 10, or the shoulder so high or pronounced, because that would lower the female gutter and the capillary exit passage to an extent which would increase or assist capillary feed instead of retarding it. Such being the case, the diameter of the male gutter causes it to project beyond the shoulder so that, in this form the curvature of rib 7, when the joint is assembled, is not continuous. In this form, the two assembled gutters are at a point above the sheet approximately equal to that of the joint apex, in a plane at a slight incline to that of the sheet but less than that of the plane of the assembled gutters of the form of Figs. 7 and 10, and they are approximately equi-distant on opposite sides of the apex. The female gutter is somewhat lower than the male gutter.

In both forms (Figs. 7, 8, 10 and 11) the overlaps of the free edges of the interengaging coupling flanges overhang the apex on one side or the other, as well as in the preferred form, and the highest point of the highest gutter is below the apex.

In the form of Figs. 8 and 11, to facilitate assembly, the free edge of the female coupling member may be slightly flared as at 13. This provides a wide entrance throat for the edge of the male loop and automatically positively guides the edges to interengaged position. It is assembled in the same manner as the modification shown in Figs. 7 and 10.

A simple, inexpensive and highly efficient form of clip or securing means for the modification of Figs. 7, 8, 10 and 11 is clearly shown in Figs. 11 and 12. In Fig. 11 it is in operative position beneath an assembled joint. This clip may be formed as a stamping, or it may be forged, according to requirements and circumstances. In the form shown it is designed for "wood decks" or for securing the joints to wooden under framing supports of one kind or another. It comprises a base 14 adapted to set on a frame member and provided with a nail hole, a triangular wall 15 perpendicular to the base, and a clamping or gripping plate 16 perpendicular to the wall 15 and extending from base 14 along the opposite edge of wall 15. At the upper corner, wall 15 is cut out or notched as at 17 to snugly receive the particular female gutter member 4 of the respective sheet. This notch, of course, will be made on the exact curvature or contour and dimensions as the part it is to receive. But, in making notch 17, its upper portion lies slightly beyond the plate 16 which is outwardly bent or deflected as at 18, to that extent, so that when the member 4 is seated within the notch 17, the deflected part 18 will embrace the upper side of it. It should be mentioned that the length of the deflected portion 18 (or the depth of the receiving notch 17) is such that when fully seated in the notch, the free edge of the respective loop 4 will project amply to freely receive thereunder the free edge of the respective cooperating male coupling flange, completely avoiding any possible interference by the clip, in the assembly operation. And, of course, the height of the wall 15 is such as to support the joint member or loop in its proper position above the plane of the sheet. For nailing purposes, plate 16 has a nail hole alined with that in the base. As each clip is slipped into place over the respective gutter-fold or loop 4 it will be nailed down. After the desired number of clips has been secured, the cooperating sheet is connected, as previously explained. Then, after the joint is assembled, the operative will simply strike a blow with a wooden mallet on the top sheet directly above each part 18. This will depress 18 on and about 4, appreciably restricting the throat of notch 17 through which 4 entered and preventing accidental withdrawal. It locks the joint to the clip which, in turn, is nailed to the frame-work. The notch 17 and deflected portion 18 will vary, of course, according to the respective member 4 to be received thereby. In addition to providing a strong securing means, this clip also provides a solid joint and rib support or stiffener at the points most needed.

For the joint of Fig. 6, the clip comprises simply a narrow band or strip of metal shaped to the outline shown in dotted lines, providing a base 14 adapted to be nailed to the frame as the clip above described. From the base extends an upright 19 carrying at its upper end a loop 20 of the exact contour and dimensions to receive the loop 4 of the preferred form of the joint. This clip is of spring metal, permitting loop 20 to open to receive loop 4. When the clip is used, with the sheet of Fig. 6, the second sheet will first be positioned, as in Fig. 3, and then swung down, as indicated and simultaneously pulled, laterally, into assembled position, all as will be clearly understood. Here, again, the clip, in addition to securing the joint to the frame, provides a strong firm support where most needed.

In Figs. 13, 14 and 15 is illustrated a clip somewhat similar in idea and general application to that indicated in dotted lines in Fig. 6. The main differences in construction are that it does not have the loop 20 to receive the loop 4, and does have a projecting toe to engage a sheet edge. It is intended to cooperate with the free edge instead of with the folded or gutter portion or loop. It does have an offset shoulder 21 in which seats and is supported the loop of one of the joint members to brace and support the joint in much the same manner as does the clip in Fig. 6. The upper curved branch is adapted to be slipped laterally between assembled joint members to such position that its toe or stop 23 will engage the free edge of the underlying sheet edge. This locks the joint to the clip, as will be clearly understood. Here, again, the clip, in addition to acting as a securing means, also strong braces the joint where most needed. This type clip may also be used for erection on metal frame-work. For that purpose, the upright is slotted as at 24 to receive one end of a metal strap or hanger which, after passing through the slot and being bent securely about the base 14 is carried down the face of the adjacent beam and, in well known manner bent securely about the beam to lock the clip to the beam. This strap, actually, for structural steel, performs the same function as the securing nails with the wood frame. This clip may be stamped, cast or forged, as desired. It is thought that its construction, operation and use will be clear.

The preferred manner of erection of the sheets of this invention is by staggering joints so that the joints of one series of sheets will fall between those of the next following series, instead of in alinement. Preferably, they are made to fall midway between. And, of course, the ends of one series overlap the ends of another and are overlapped by the ends of another. Since each sheet has a centrally disposed rib 25, the simplest staggering arrangement is to so dispose the sheets that the joints of each series aline with the central rib of the adjacent series. Such being the case, that end portion of each central rib which overlaps an assembled joint will be given the corresponding interior shape to snugly fit over and about the exterior of the joint so that there will be a complete accurate nesting and continuous uninterrupted outer surface along the overlap. And the same is true as to that end portion of each such central rib which is overlapped by an assembled joint. It will be given the corresponding exterior shape for like purpose.

It is thought that the construction, operation and use of the invention will be clear from the prereding detailed description. Many changes may be made in the construction, arrangements and dispositions of the various parts of the invention within the scope of the appended claims without departing from the field of the invention and it is meant to include all such within this application wherein only a prefered form and several modifications have been illustrated by way of example and with no intent to in any manner limit the claims by such illustration.

Having described my invention, what I claim and desire to protect by Letters Patent is:

1. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flange portions overhanging on opposite sides of the apex of the assembled joint, one of said coupling flange portions being provided with a spherically enlarged gutter formed in its fold or closed end and lying to one side of the apex of the assembled joint.

2. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flange portions overhanging on opposite sides of the apex of the assembled joint, said coupling flanges each being provided with an enlarged drainage gutter formed in its fold or closed end, said gutters lying on opposite sides of the apex of the assembled joint.

3. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flange portions overhanging on opposite sides of the apex of the assembled joint, one of said coupling flanges being provided with an enlarged gutter formed in its fold or closed end and lying to one side of the apex of the assembled joint and at the approximate height of said apex.

4. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flange portions overhanging on opposite sides of the apex of the assembled joint, said coupling flanges each being provided with an enlarged drainage gutter formed in its fold or closed end, said gutters lying on opposite sides of the apex of the assembled joint, one of said gutters lying at the approximate height of said apex.

5. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flange portions overhanging on opposite sides of the apex of the assembled joint, said coupling flanges each being provided with an enlarged drainage gutter formed in its closed end or fold, said gutters lying on opposite sides of the apex of the assembled joint and a stop shoulder formed in said sheet and engageable by one of said gutters to position the joint members in assembling.

6. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flanges overhanging on opposite sides of the apex of the assembled joint, said coupling flanges each being provided with an enlarged drainage gutter formed in its fold or closed end, said gutters lying on opposite sides of the apex of the assembled joint, one of said gutters being exterior of said assembled joint.

7. A metal joint sheet provided with main flanges extending along opposite edges in the form of ribs, said main flanges having coupling flanges folded over on opposite sides of said sheet, said coupling flange portions having curvatures which, in assembled relation, are approximately concentric with cooperating rib surfaces, and nest with said surfaces, said coupling flanges overhanging on opposite sides of the apex of the assembled joint, said coupling flanges each being provided with an enlarged drainage gutter formed in its fold or closed end, said gutters lying on opposite sides of the apex of the assembled joint, one of the gutters being exterior to said assembled joint and the other being interior thereof.

8. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flange portions overhanging on opposite sides of the apex of the assembled joint, one of said coupling flanges being provided with a spherically enlarged gutter formed in its fold or closed end and lying to one side of the apex of the assembled joint, and the other of said coupling flanges being provided with a flared entrance for guiding said coupling flanges to assembled relation.

9. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib surfaces, and nest with said surfaces, said coupling flange portions overhanging on opposite sides of the apex of the assembled joint, said coupling flanges each provided with an enlarged drainage gutter formed in its fold or closed end, said gutters lying on opposite sides of the apex of the assembled joint, said coupling flanges being laterally slidably, separably engaged.

10. A metal joint sheet provided with main flanges extending along opposite edges in the form of ribs, said main flanges having coupling flange portions folded over in opposite directions on opposite sides of said sheet, said coupling flange portions having curvatures which, in assembled relation, are approximately concentric with cooperating rib portions, nest with said portions, and are rotatable about a center common to said cooperating flange and rib portions, said coupling flanges, in assembled relation, being interengaged, said coupling flange portions having surface engagement with said cooperating rib portions continuously during the assembling operation.

11. A metal joint sheet provided with main flanges extending along opposite edges in the form of ribs, said main flanges having coupling flange portions folded over in opposite directions on opposite sides of said sheet, said coupling flange portions and said ribs being formed with curvatures which, in assembled relation, are approximately concentric with each other, nest one within the other, and are rotatable about their common center relatively to each other to and from interengaged operative position, said coupling flange portions having surface engagement with said ribs continuously during the assembling operation, and a nailing strip carried by one of said coupling flanges.

12. A metal joint sheet provided with main flanges extending along opposite edges in the form of ribs, said main flanges having coupling flange portions folded over in opposite directions on opposite sides of the sheet, said coupling flange portions and said ribs being formed with curvatures which, in assembled relation, are approximately concentric with each other, nest one within the other and are rotatable about their common center relatively to each other to and from interengaged operative position, one of said coupling flanges terminating high up on the rib in position to expose its free edge for ready insertion thereunder of the other coupling flange of a cooperating sheet, said coupling flange portions having surface engagement with said ribs continuously during the assembling operation.

13. A metal joint sheet provided with main flanges extending along opposite edges in the form of ribs, said main flanges having coupling flange portions folded over in opposite directions on opposite sides of said sheet, said coupling flange portions and said ribs being formed with curvatures which in assembled relation are approximately concentric with each other, nest one within the other and are rotatable about their common center relatively to each other to and from interengaged operative position, the overlying coupling flange terminating high up on the side of the rib in position to expose its free edge for the ready insertion thereunder of the underlying coupling flange, said coupling flange portions having surface engagement with said ribs continuously during the assembling operation.

14. A metal joint sheet provided with main flanges extending along opposite edges in the form of ribs, said main flanges having coupling flange portions folded over in opposite directions on opposite sides of said sheet, said coupling flange portions having curvatures which, in as-assembled relation, are approximately concentric with cooperating rib surfaces, nest with said surfaces and are rotatable about a center common to said cooperating flange and rib surfaces to and from interengaged operative position, the overlying coupling flange terminating beyond the joint apex and in position to expose its free edge for the ready insertion thereunder of the underlying coupling flange, said coupling flange portions having surface engagement with said cooperating rib surfaces continuously during the assembling operation and a nailing strip formed in continuation of the overlying coupling flange.

HARRY R. ANSEL.